US006879552B2

(12) United States Patent
Kase (10) Patent No.: US 6,879,552 B2
(45) Date of Patent: Apr. 12, 2005

(54) INFORMATION RECORDING AND REPRODUCING SYSTEM ENABLING A SELECTION OF WHETHER OR NOT TO PERFORM AN INTERRUPTION AND RESUMPTION OF A DATA-RECORDING

(75) Inventor: Toshiyuki Kase, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 415 days.

(21) Appl. No.: 09/985,783

(22) Filed: Nov. 6, 2001

(65) Prior Publication Data

US 2002/0060962 A1 May 23, 2002

(30) Foreign Application Priority Data

Nov. 17, 2000 (JP) ........................................ 2000-350819

(51) Int. Cl.[7] .............................................. G11B 7/00
(52) U.S. Cl. ................................ 369/47.11; 369/47.39; 369/47.33
(58) Field of Search .......................... 369/47.11, 47.39, 369/47.33, 47.3, 47.53

(56) References Cited

U.S. PATENT DOCUMENTS

| 6,538,962 B2 | * | 3/2003 | Hyun ....................... 369/30.23 |
| 2001/0006498 A1 | * | 7/2001 | Hayashi et al. ........... 369/47.33 |
| 2002/0041554 A1 | * | 4/2002 | Kitamura et al. ........ 369/53.37 |

FOREIGN PATENT DOCUMENTS

| EP | 974966 A1 | * | 1/2000 | .......... G11B/20/10 |
| JP | 07336640 A | * | 12/1995 | ............ H04N/5/92 |
| JP | 09231011 A | * | 9/1997 | ............. G06F/3/06 |
| JP | 10-49990 | | 2/1998 | |
| JP | 2000-40302 | | 2/2000 | |
| JP | 2000040302 A | * | 2/2000 | .......... G11B/20/10 |

* cited by examiner

Primary Examiner—Hoa T. Nguyen
Assistant Examiner—Peter Vincent Agustin
(74) Attorney, Agent, or Firm—Dickstein Shapiro Morin & Oshinksy LLP

(57) ABSTRACT

An information recording and reproducing system comprises a host device, and an information recording and reproducing device connected with the host device via a host interface. The host device includes a control-command issuing unit issuing a control command to the information recording and reproducing device. The control command causes a data-recording interrupting-resuming unit of the information recording and reproducing device either or not to perform the interruption and resumption of the recording. The information recording and reproducing device includes a data-recording interruption-resumption control unit controlling the data-recording interrupting-resuming unit either or not to perform the interruption and resumption of the recording, according to the control command received from the host device. The interruption and resumption of the recording is performed by linking an end point of data upon the interruption with a start point of the data upon the resumption so as to maintain a continuity of the data.

6 Claims, 10 Drawing Sheets

INFORMATION RECORDING AND REPRODUCING SYSTEM ENABLING A
SELECTION OF WHETHER OR NOT TO
PERFORM AN INTERRUPTION AND
RESUMPTION OF A DATA-RECORDING

BACKGROUND OF THE INVENTION

1. Field of the Invention

The present invention generally relates to an information recording and reproducing system, and more particularly, to an information recording and reproducing system formed by a host device (a host computer), such as a personal computer, and an information recording and reproducing device, such as an optical disk drive device.

2. Description of the Related Art

Recently, in a field of an optical disk recording and reproducing system, for example, in a field of a recordable/rewritable CD, there has been a technical issue concerning an error (hereinafter referred to as a buffer underrun) resulting from an interruption in transferring write data.

Thereupon, for the purpose of eliminating an abnormal end of data-writing due to the above-mentioned buffer underrun, there have been proposed information recording and reproducing devices, such as an optical disk device that resumes a data-writing by linking an end point of write data upon interruption with a start point of the write data upon resumption so as to maintain a continuity of the write data, in a case of interrupting a data-writing from a host computer (for example, in Japanese Laid-Open Patent Application No. 10-49990 and Japanese Laid-Open Patent Application No. 2000-40302).

As described above, when a buffer-underrun error occurs, the conventional information recording and reproducing devices avoid an abnormal end of a data writing by interrupting and resuming a recording. However, the recording quality of data recorded on a recording medium with the interruption and the resumption does not necessarily excel a recording quality of data recorded on a recording medium without interruption; therefore, a user may possibly become unable to have a data-writing be performed with a high quality.

SUMMARY OF THE INVENTION

It is a general object of the present invention to provide an improved and useful information recording and reproducing system in which the above-mention problems are eliminated.

A more specific object of the present invention is to provide an information recording and reproducing system which can perform a data-writing with priority being placed on a recording quality of data to be recorded on a recording medium, according to a user's preference.

In order to achieve the above-mentioned objects, there is provided according to one aspect of the present invention an information recording and reproducing system comprising:

a host device; and an information recording and reproducing device connected with the host device via a host interface, the information recording and reproducing device including a data-recording interrupting-resuming unit that performs a recording of data transferred from the host device via the host interface on a recording medium at a predetermined data-writing velocity, and, in a case of having interrupted the recording, resumes the recording by linking an end point of the data upon the interruption with a start point of the data upon the resumption so as to maintain a continuity of the data, wherein the host device includes a control-command issuing unit issuing a control command to the information recording and reproducing device, the control command causing the data-recording interrupting-resuming unit either to perform the interruption and resumption of the recording or not to perform the interruption and resumption of the recording, and the information recording and reproducing device includes a data-recording interruption-resumption control unit controlling the data-recording interrupting-resuming unit either to perform the interruption and resumption of the recording or not to perform the interruption and resumption of the recording, according to the control command received from the host device via the host interface.

Additionally, the information recording and reproducing system according to the present invention may further comprise a selection inputting unit supplying the control-command issuing unit with an arbitrary selection that causes the control-command issuing unit to issue either of a control command causing the data-recording interrupting-resuming unit to perform the interruption and resumption of the recording, and a control command causing the data-recording interrupting-resuming unit not to perform the interruption and resumption of the recording.

Additionally, in the information recording and reproducing system according to the present invention, the host device may further include:

a test-writing unit causing the information recording and reproducing device to perform a test-writing to the recording medium at a predetermined writing velocity;

an interruption-probability judging unit making a judgment on whether or not there is a probability of the interruption during a recording of data to the recording medium, according to a result of the test-writing;

an interruption-probability judgment-result outputting unit outputs a result of the judgment; and a selection-inputting function control unit enabling the selection via the selection inputting unit, after the interruption-probability judgment-result outputting unit outputs the result of the judgment.

Additionally, in the information recording and reproducing system according to the present invention, the interruption-probability judging unit may further include a selection-information creating unit creating appropriate selection information based on conditions including a data capacity to be written to the recording medium, when the interruption-probability judging unit judges that there is a probability of the interruption during a recording of data to the recording medium, the selection information being used to perform the recording without the interruption, and the interruption-probability judgment-result outputting unit may further include a selection-information outputting unit outputting the selection information along with the result of the judgment.

Additionally, in the information recording and reproducing system according to the present invention, the interruption-probability judging unit may further include a data-writing interruption-frequency estimating unit estimating a data-writing interruption frequency during a recording of data to the recording medium, based on conditions including a data capacity to be written to the recording medium, and a data transfer rate to the information recording and reproducing device, when the interruption-probability judging unit judges that there is a probability of the interruption during the recording of the data to the recording medium, and the interruption-probability judgment-result outputting unit may further include a data-writing interruption-frequency outputting unit outputting the data-writing interruption frequency along with the result of the judgment.

Additionally, in the information recording and reproducing system according to the present invention, the interruption-probability judging unit may further include a relation estimating unit estimating a relation between the data-writing interruption frequency and the writing velocity, the interruption-probability judgment-result outputting unit may further include a relation-information outputting unit outputting relation information indicating the relation, and the selection-inputting function control unit may further include a writing-velocity selecting unit enabling a setting of the writing velocity and the selection via the selection inputting unit, according to the relation information output by the relation-information outputting unit.

According to the present invention, the information recording and reproducing system can perform a data-writing with priority being placed on a recording quality of data to be recorded on the recording medium, according to a user's preference.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments according to the present invention.

Figure 1:
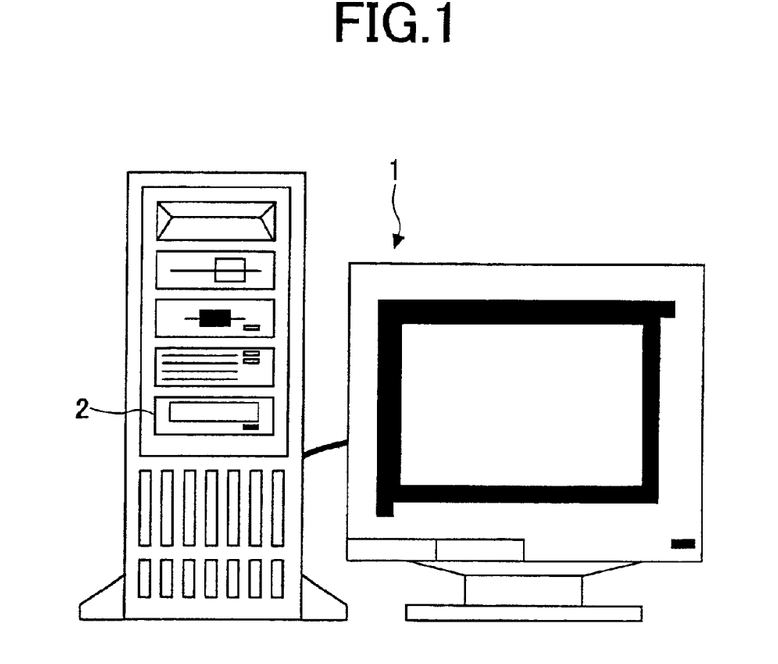
FIG. 1 is a perspective view showing an outer structure of an information recording and reproducing system according to an embodiment of the present invention.

FIG. 1 is a perspective view showing an outer structure of an information recording and reproducing system according to an embodiment of the present invention.

This information recording and reproducing system comprises a CD-R/RW drive 2 as an optical disk device, and a personal computer 1 as a host device. The CD-R/RW drive 2 has a just-link function according to the present invention, which is a function of resuming a recording (a data-writing) with maintaining a data-continuity. CD-R/RW data-writing software is installed in the personal computer 1. The CD-R/RW data-writing software controls the CD-R/RW drive 2. Optical-disk data-writing software is operated in the personal computer 1. The optical-disk data-writing software has functions including a function of arbitrarily issuing a just-link function on/off command according to the present invention. The personal computer 1 and the CD-R/RW drive 2 are connected with each other via a general-purpose host interface such that data can be communicated with each other.

Figure 2:
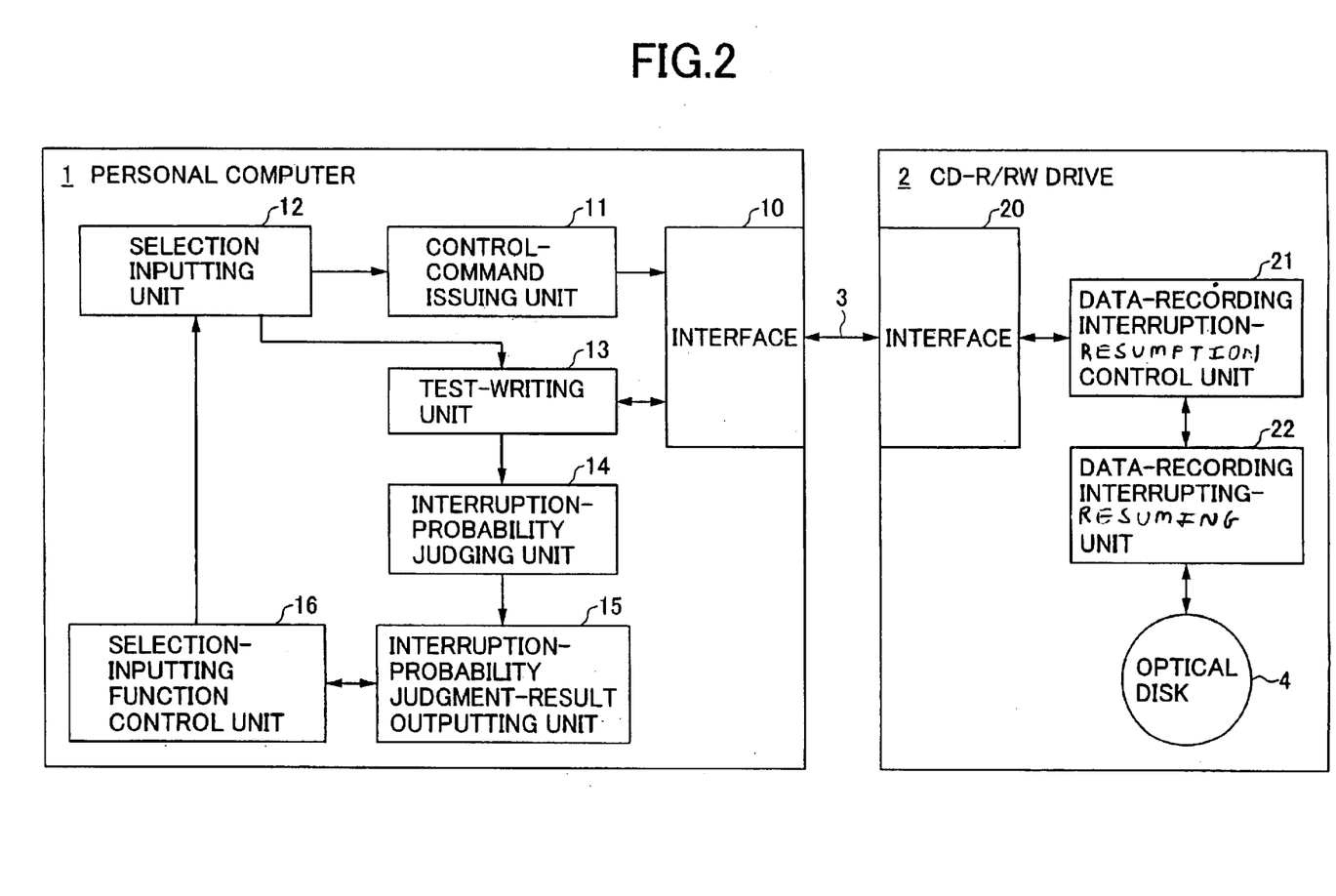
FIG. 2 is a functional block diagram showing inner functional structures of a personal computer and a CD-R/RW drive of the information recording and reproducing system shown in FIG. 1.

FIG. 2 is a functional block diagram showing inner functional structures of the personal computer 1 and the CD-R/RW drive 2 of the information recording and reproducing system shown in FIG. 1.

The personal computer 1 is a host device realized by a microcomputer composed of a CPU, a ROM, a RAM, etc. The personal computer 1 comprises functional units, such as an interface 10, a control-command issuing unit 11, a selection inputting unit 12, a test-writing unit 13, an interruption-probability judging unit 14, an interruption-probability judgment-result outputting unit 15, and a selection-inputting function control unit 16. Other well-known functional units included in a normal computer will neither be shown in the figures nor be described in the following description.

The CD-R/RW drive 2 is an information recording and reproducing device realized also by a microcomputer composed of a CPU, a ROM, a RAM, etc. The CD-R/RW drive 2 comprises functional units, such as an interface 20, a data-recording interruption-resumption control unit 21, and a data-recording interrupting-resuming unit 22. The CD-R/RW drive 2 writes and reads data on an optical disk (CD-R/RW) 4 which is a recording medium. Other well-known functional units will neither be shown in the figures nor be described in the following description.

The interface 10 of the personal computer 1 is connected with the CD-R/RW drive 2 via a general-purpose host interface 3, such as an ATAPI, an IEEE, an SCSI, or a USB, so as to enable a data communication between the personal computer 1 and the CD-R/RW drive 2. The hereinbelow-described units exchange data, such as a control command, with the CD-R/RW drive 2 via the interface 10.

The control-command issuing unit 11 issues a control command to the data-recording interruption-resumption control unit 21 of the CD-R/RW drive 2 via the interface 10 and the host interface 3. The control command causes the data-recording interrupting-resuming unit 22 either to interrupt and resume a data-writing or not.

The selection inputting unit 12 supplies an arbitrary selection regarding which of the control commands is to be issued, a control command causing the data-recording interrupting-resuming unit 22 to interrupt and resume a data-writing, or a control command causing the data-recording interrupting-resuming unit 22 not to interrupt and resume a data-writing. The selection inputting unit 12 supplies the selection to the control-command issuing unit 11. Either of the control commands according to the selection is sent to the data-recording interruption-resumption control unit 21 of the CD-R/RW drive 2 via the host interface 3.

The test-writing unit 13 sends an instruction to the data-recording interruption-resumption control unit 21 of the CD-R/RW drive 2 so as to cause the data-recording interrupting-resuming unit 22 of the CD-R/RW drive 2 to perform a test-writing to the optical disk 4 at a predetermined writing velocity.

According to the result of the test-writing conducted by the test-writing unit 13, the interruption-probability judging unit 14 judges whether or not there is a probability of an interruption during a data-writing to the optical disk 4.

The above-mentioned result of the test-writing is based on data transmitted from the data-recording interruption-resumption control unit 21 of the CD-R/RW drive 2.

The interruption-probability judgment-result outputting unit 15 displays the result of the judgment made by the interruption-probability judging unit 14 on a display, such as a CRT, or an LCD, or prints out the result of the judgment by using a printing device, such as a printer, not shown in the figures.

The selection-inputting function control unit 16 performs a function control enabling the selection-inputting function provided by the selection inputting unit 12 (a control making the selection input effective or ineffective), after the interruption-probability judgment-result outputting unit 15 outputs the result of the judgment.

The interface 20 of the CD-R/RW drive 2 is connected with the personal computer 1 via the host interface 3 so as to enable a data communication between the personal computer 1 and the CD-R/RW drive 2. The hereinbelow-described units exchange data with the personal computer 1 via the interface 20.

The data-recording interruption-resumption control unit 21 controls the data-recording interrupting-resuming unit 22 either to interrupt and resume a data-writing or not, according to the control command received from the control-command issuing unit 11 of the personal computer 1 via the host interface 3. Additionally, the data-recording interruption-resumption control unit 21 controls the data-recording interrupting-resuming unit 22 to perform the test-writing as well as a normal data-writing/reading to/from the optical disk 4, according to instructions sent from the personal computer 1. Further, the data-recording interruption-resumption control unit 21 controls a transmission of read data and various information to the personal computer 1 via the interface 20 and the host interface 3.

Under the control of the data-recording interruption-resumption control unit 21, the data-recording interrupting-resuming unit 22 records data transferred from the personal computer 1 via the host interface 3 on the optical disk 4 at a predetermined data-writing velocity. In a case of having interrupted the recording, the data-recording interrupting-resuming unit 22 resumes the recording by linking an end point of the write data upon the interruption with a start point of the write data upon resumption so as to maintain a continuity of the write data. Additionally, the data-recording interrupting-resuming unit 22 performs the test-writing as well as a normal data-writing/reading.

Next, a description will be given of a data-recording process in this information recording and reproducing system.

Figure 3:
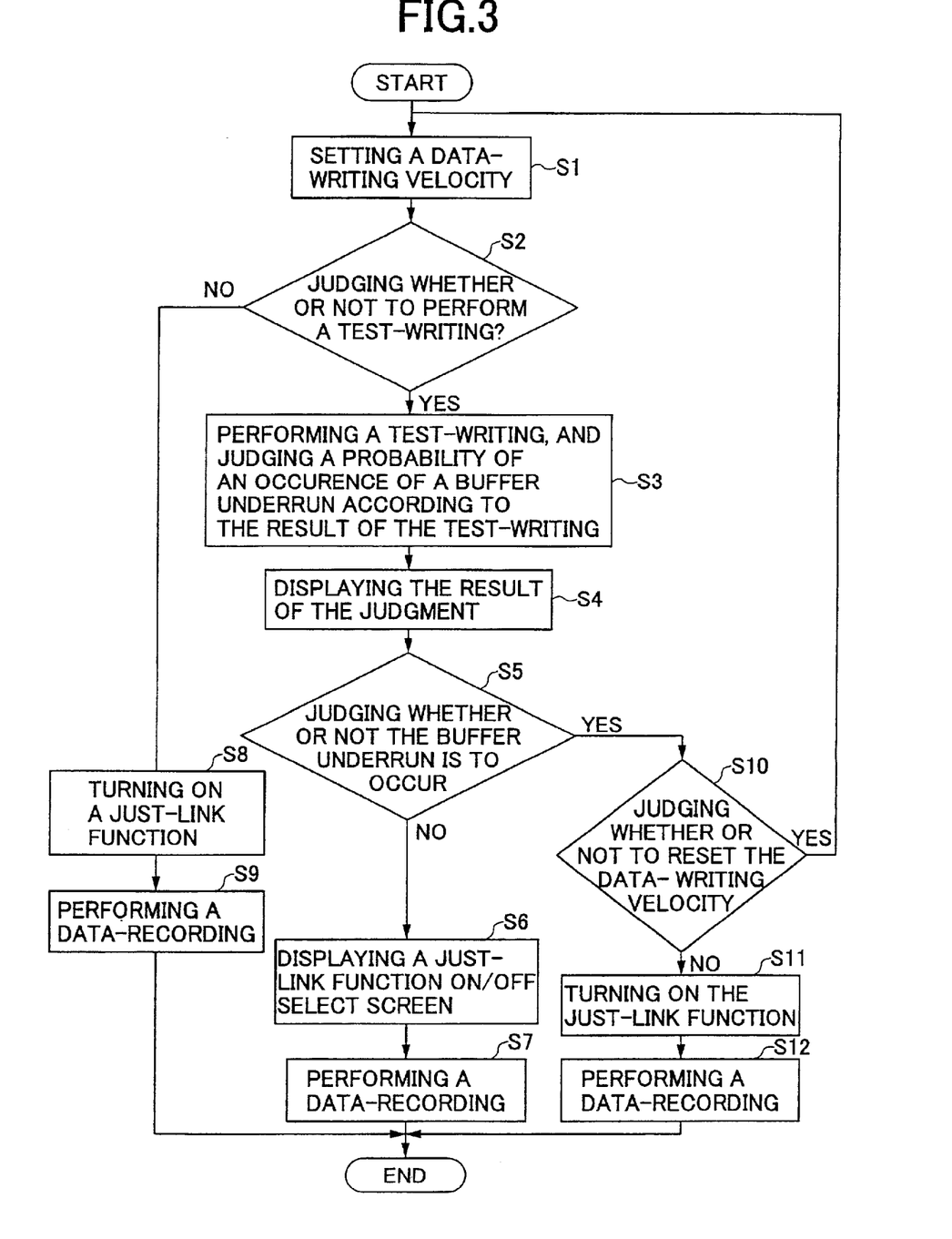
FIG. 3 is a flowchart showing a data-recording process in the information recording and reproducing system according to the present embodiment.

FIG. 3 is a flowchart showing the data-recording process in the information recording and reproducing system according to the present embodiment.

When a user operates the personal computer 1 so as to set a data-writing velocity as is the case for normal data-writing software, the control-command issuing unit 11 sets the data-writing velocity to the data-recording interruption-resumption control unit 21 of the CD-R/RW drive 2, in step 1 (S1 in the figures). In step 2, it is judged whether or not to perform a test-writing. When it is judged, according to a selection input by the user via the selection inputting unit 12, that a test-writing is not to be performed (N in the step 2), step 8 is performed next, in which the control-command issuing unit 11 turns on (effective) the above-mentioned just-link function (the function of resuming a recording with maintaining a data-continuity) with respect to the data-recording interruption-resumption control unit 21. In step 9, the data-recording interruption-resumption control unit 21 of the CD-R/RW drive 2 controls the data-recording interrupting-resuming unit 22 to perform a data-recording at the above-mentioned data-writing velocity to the optical disk 4. Thereafter, this data-recording process is ended.

On the other hand, when it is judged, according to the selection input by the user via the selection inputting unit 12, that a test-writing is to be performed (Y in the step 2), step 3 is performed next, in which the test-writing unit 13 instructs the data-recording interruption-resumption control unit 21 of the CD-R/RW drive 2 to perform a test-writing. The data-recording interruption-resumption control unit 21 controls the data-recording interrupting-resuming unit 22 to perform the test-writing at the above-mentioned data-writing velocity to the optical disk 4, and sends the result of the test-writing back to the test-writing unit 13. The test-writing unit 13 sends the result of the test-writing to the interruption-probability judging unit 14. According to the result of the test-writing, the interruption-probability judging unit 14 judges a probability of an occurrence of a buffer underrun during a data-recording resulting from the above-mentioned data-writing velocity and other conditions, such as a data transfer rate of the personal computer 1, and sends the result of the judgment to the interruption-probability judgment-result outputting unit 15.

In step 4, the interruption-probability judgment-result outputting unit 15 displays the result of the judgment on the display. In step 5, it is judged whether or not the buffer underrun is to occur. When it is judged that the buffer underrun is not to occur (N in the step 5), step 6 is performed next, in which a select screen is displayed on the display for selectively inputting on/off (effective/ineffective) of the above-mentioned just-link function (the function of resuming a recording with maintaining a data-continuity), and the selection-inputting function control unit 16 enables the above-mentioned selective on/off input via the selection inputting unit 12.

In step 7, according to the selective input via the selection inputting unit 12, the control-command issuing unit 11 sends a control command turning on or off (effective or ineffective) the above-mentioned just-link function to the data-recording interruption-resumption control unit 21. The data-recording interruption-resumption control unit 21 of the CD-R/RW drive 2 controls the data-recording interrupting-resuming unit 22 to turn on or off the above-mentioned just-link function and perform a data-recording at the above-mentioned data-writing velocity to the optical disk 4. Thereafter, this data-recording process is ended.

When it is judged that the buffer underrun is to occur (Y in the step 5), step 10 is performed next, in which it is judged whether or not to reset the data-writing velocity. When it is judged, according to a selection input via the selection inputting unit 12, that the data-writing velocity is to be reset (Y in the step 10), the step 1 is performed again, in which the user resets the data-writing velocity.

When it is judged, according to the selection input via the selection inputting unit 12, that the data-writing velocity is not to be reset (N in the step 10), step 11 is performed next, in which the control-command issuing unit 11 sends a control command turning on the above-mentioned just-link function to the data-recording interruption-resumption control unit 21. The data-recording interruption-resumption control unit 21 of the CD-R/RW drive 2 controls the data-recording interrupting-resuming unit 22 to turn on the above-mentioned just-link function and perform a data-recording at the above-mentioned data-writing velocity to the optical disk 4 in step 12. Thereafter, this data-recording process is ended.

Figure 4:
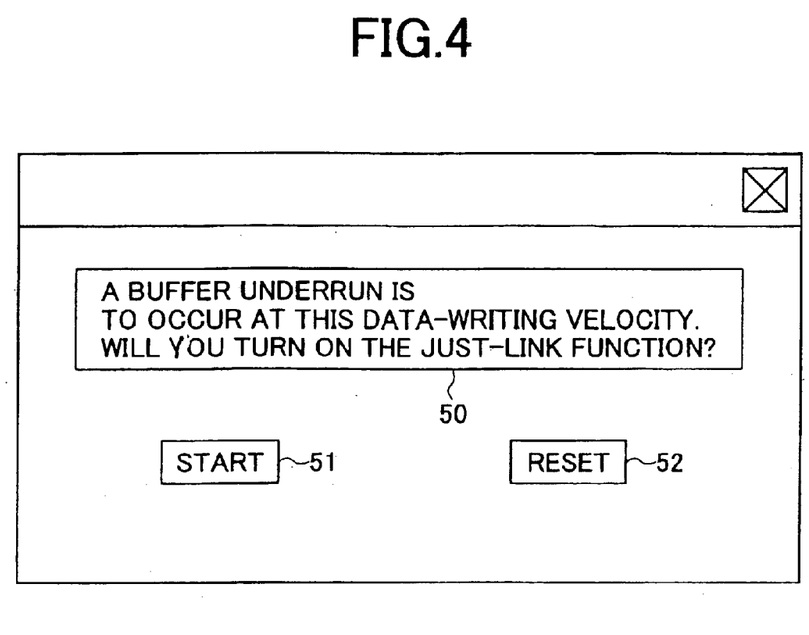
FIG. 4 is an illustration of an example of a just-link function on/off select screen displayed when it is judged in the data-recording process shown in FIG. 3 that there is a probability of an occurrence of a buffer underrun.

FIG. 4 is an illustration of an example of a just-link function on/off select screen displayed in the step 10 of the above-described data-recording process when it is judged that there is a probability of an occurrence of a buffer underrun.

This select screen is displayed when a buffer underrun is to occur, according to the judgment of the data-writing software. In the screen are displayed a judgment result 50 containing a message indicating that there is a probability of an occurrence of a buffer underrun according to the result of a test-writing and a message prompting a user to either turn on the just-link function or reset the data-writing velocity, a start button 51 to turn on the just-link function and perform a data-writing, and a reset button 52 to reset the data-writing velocity.

Figure 5:
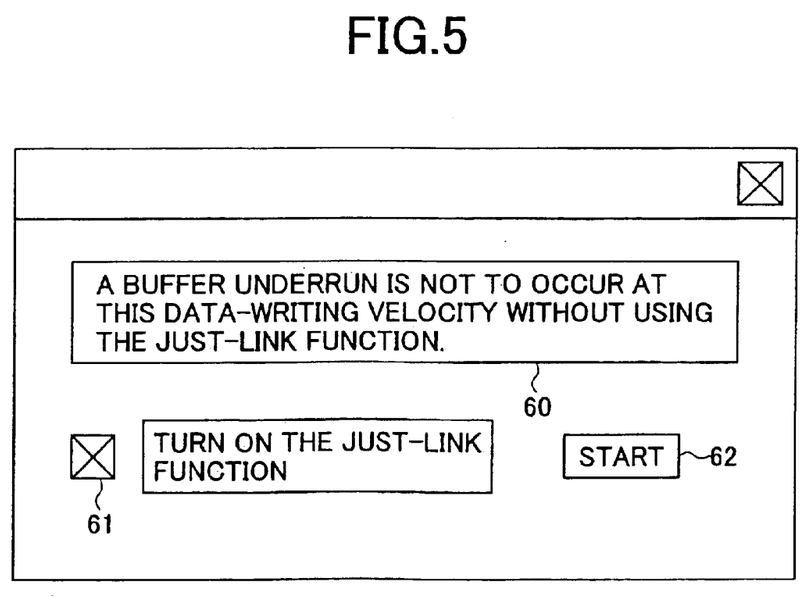
FIG. 5 is an illustration of an example of a just-link function on/off select screen displayed when it is judged in the data-recording process shown in FIG. 3 that there is not a probability of an occurrence of a buffer underrun.

FIG. 5 is an illustration of an example of a just-link function on/off select screen displayed in the step 6 of the above-described data-recording process when it is judged that there is not a probability of an occurrence of a buffer underrun.

This select screen is displayed when a buffer underrun is not to occur, according to the judgment of the data-writing software. In the screen are displayed a judgment result 60 containing a message indicating that there is not a probability of an occurrence of a buffer underrun even without using the just-link function according to the result of a test-writing, a check box 61 providing a user interface to turn on the just-link function and perform a data-writing, and a start button 62 to turn off the just-link function and perform a data-writing.

As described above, according to the data-recording process performed in the information recording and reproducing system of the present embodiment, the system judges, based on a test-writing, whether or not the just-link function (the function of resuming a recording with maintaining a data-continuity) is necessary, and provides information that facilitates a user's selection such that, when the just-link function is not necessary, the user can arbitrarily select the just-link function being turned on/off, immediately before starting a data-writing. Thus, the information recording and reproducing system is more convenient for a user because the system can easily perform a data-writing with priority being placed on a recording quality of data to be recorded on the optical disk, according to the user's preference.

Next, a description will be given of another embodiment according to the present invention.

Figure 6:
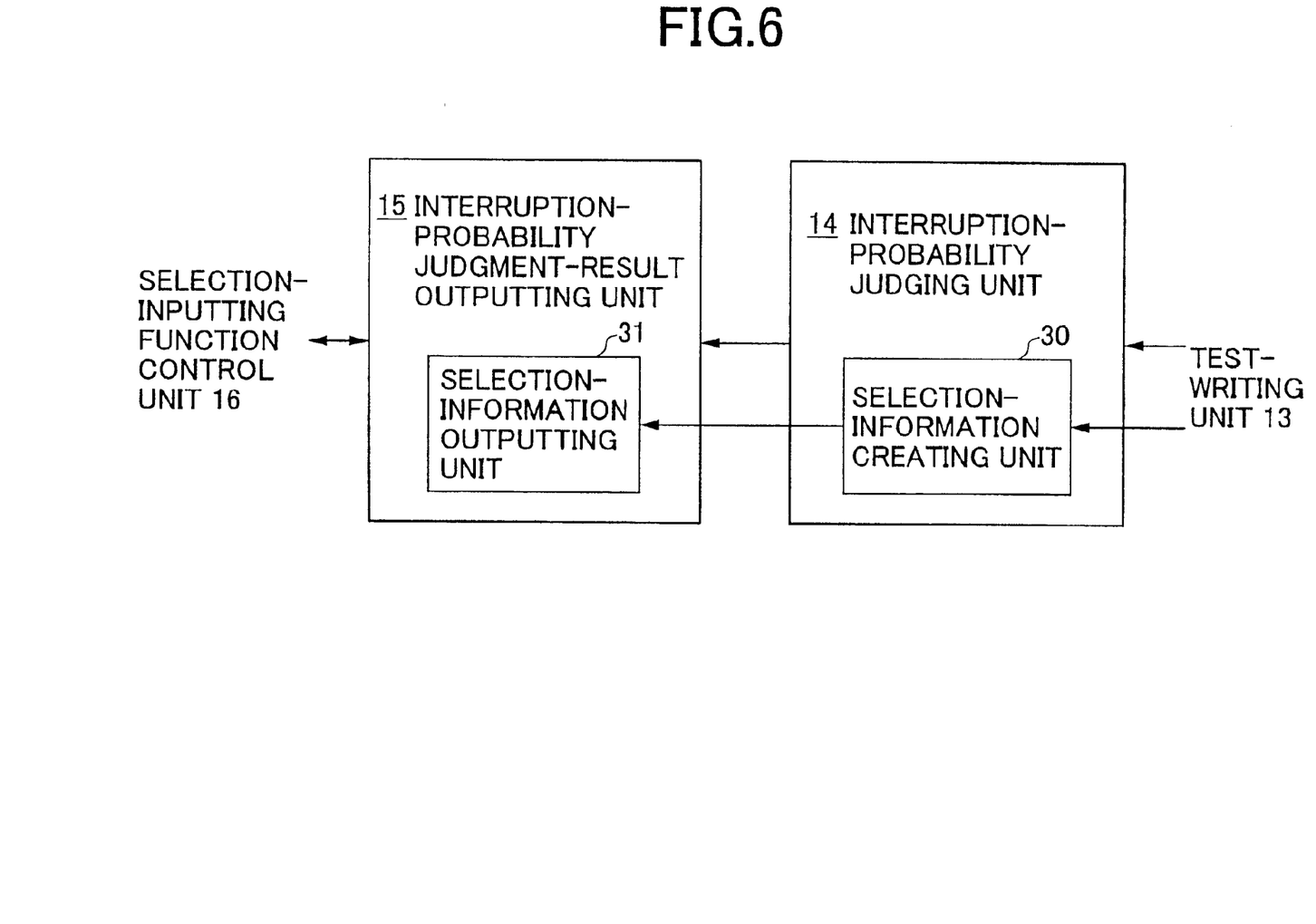
FIG. 6 is a functional block diagram showing inner functional structures of an interruption-probability judging unit and an interruption-probability judgment-result outputting unit shown in FIG. 2, according to another embodiment of the present invention.

As shown in FIG. 6, in an information recording and reproducing system according to the present embodiment, the interruption-probability judging unit 14 of the personal computer 1 further comprises a selection-information creating unit 30, and the interruption-probability judgment-result outputting unit 15 further comprises a selection-information outputting unit 31, compared with the information recording and reproducing system shown in FIG. 2

When it is judged that there is a probability of an interruption during a data-writing, the selection-information creating unit 30 creates appropriate selection information based on conditions, such as a data capacity to be written to the optical disk 4. The selection information is used to perform a data-writing without an interruption during the data-writing.

The selection-information outputting unit 31 displays the above-mentioned selection information as well as the above-mentioned result of the judgment on the display, or prints out the selection information and the result of the judgment by using a printer not shown in the figures.

Next, a description will be given of a data-recording process in this information recording and reproducing system.

Figure 7:
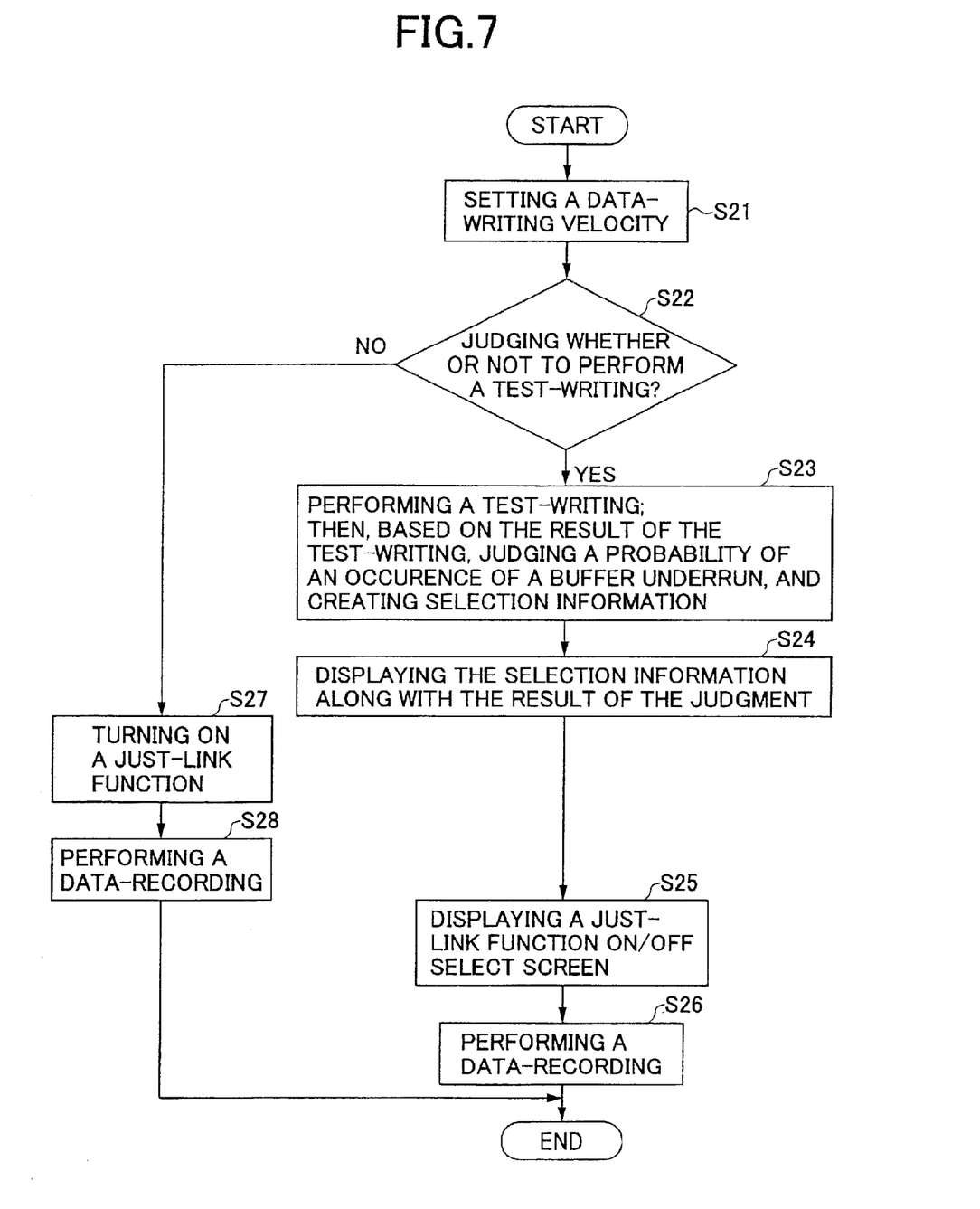
FIG. 7 is a flowchart showing a data-recording process in the information recording and reproducing system according to the present embodiment.

FIG. 7 is a flowchart showing the data-recording process in the information recording and reproducing system according to the present embodiment.

When a user operates the personal computer 1 so as to set a data-writing velocity as is the case for normal data-writing software, the control-command issuing unit 11 sets the data-writing velocity to the data-recording interruption-resumption control unit 21 of the CD-R/RW drive 2, in step 21. In step 22, it is judged whether or not to perform a test-writing. When it is judged, according to a selection input by the user via the selection inputting unit 12, that a test-writing is not to be performed (N in the step 22), step 27 is performed next, in which the control-command issuing unit 11 turns on (effective) the above-mentioned just-link function (the function of resuming a recording with maintaining a data-continuity) with respect to the data-recording interruption-resumption control unit 21. In step 28, the data-recording interruption-resumption control unit 21 of the CD-R/RW drive 2 controls the data-recording interrupting-resuming unit 22 to perform a data-recording at the above-mentioned data-writing velocity to the optical disk 4. Thereafter, this data-recording process is ended.

On the other hand, when it is judged, according to the selection input by the user via the selection inputting unit 12, that a test-writing is to be performed (Y in the step 22), step 23 is performed next, in which the test-writing unit 13 instructs the data-recording interruption-resumption control unit 21 of the CD-R/RW drive 2 to perform a test-writing. The data-recording interruption-resumption control unit 21 controls the data-recording interrupting-resuming unit 22 to perform the test-writing at the above-mentioned data-writing velocity to the optical disk 4, and sends the result of the test-writing back to the test-writing unit 13. The test-writing unit 13 sends the result of the test-writing to the interruption-probability judging unit 14. According to the result of the test-writing, the interruption-probability judging unit 14 judges a probability of an occurrence of a buffer underrun during a data-recording resulting from the above-mentioned data-writing velocity and other conditions, such as a data transfer rate of the personal computer 1. Based on the result of the judgment and conditions, such as a data capacity to be written to the optical disk 4, the selection-information creating unit 30 creates appropriate selection information used to perform the data-writing without an interruption, and sends the result of the judgment and the selection information to the interruption-probability judgment-result outputting unit 15.

In step 24, the interruption-probability judgment-result outputting unit 15 displays the result of the judgment on the display, and the selection-information outputting unit 31 displays the selection information on the display. In step 25, a select screen is displayed on the display for selectively inputting on/off (effective/ineffective) of the above-mentioned just-link function (the function of resuming a recording with maintaining a data-continuity), and the selection-inputting function control unit 16 enables the above-mention selective on/off input via the selection inputting unit 12.

In step 26, according to the selective input via the selection inputting unit 12, the control-command issuing unit 11 sends a control command turning on or off (effective or ineffective) the above-mentioned just-link function to the data-recording interruption-resumption control unit 21. The data-recording interruption-resumption control unit 21 of the CD-R/RW drive 2 controls the data-recording interrupting-resuming unit 22 to turn on or off the above-mentioned just-link function and perform a data-recording at the data-writing velocity to the optical disk 4. Thereafter, this data-recording process is ended.

Figure 8:
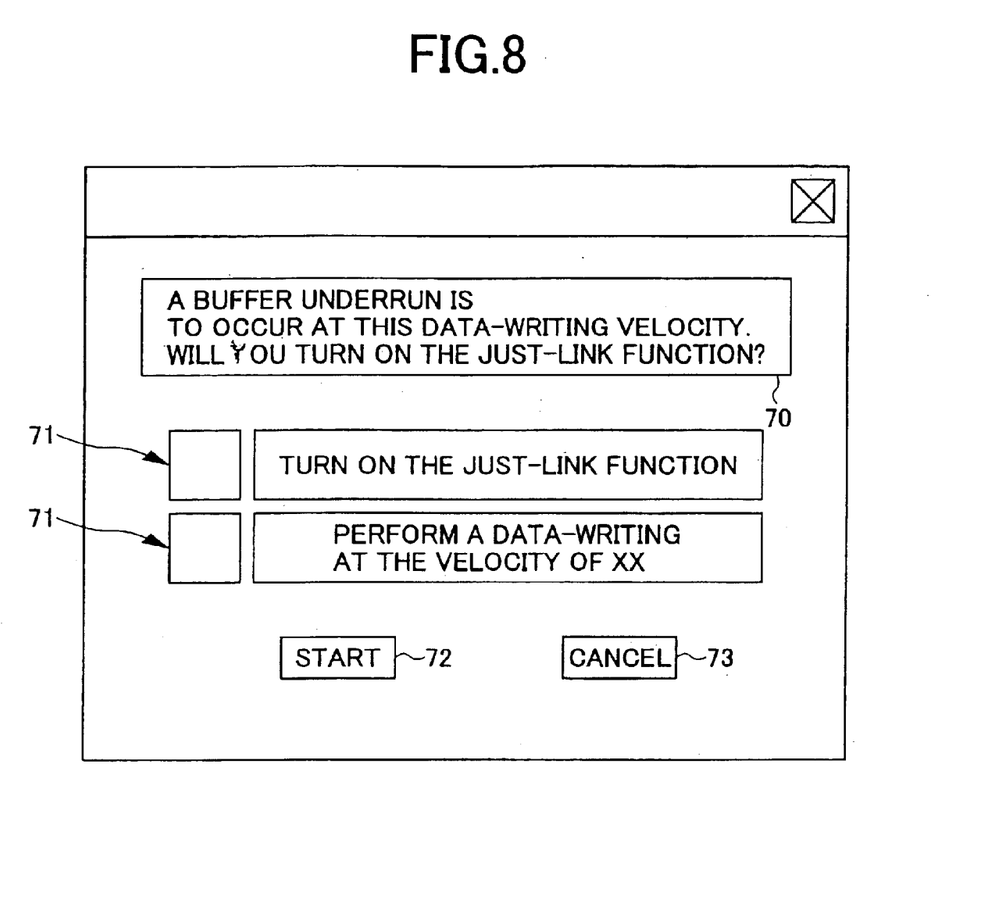
FIG. 8 is an illustration of an example of a just-link function on/off select screen displayed along with a judgment result and selection information in the data-recording process shown in FIG. 7.

FIG. 8 is an illustration of an example of a just-link function on/off select screen displayed along with the result of the judgment and the selection information in the above-described data-recording process.

This select screen is displayed when a buffer underrun is to occur, according to the judgment of the data-writing software. In the screen are displayed a judgment result 70 containing a message indicating that there is a probability of an occurrence of a buffer underrun according to the result of a test-writing and a message asking a user whether to turn on the just-link function, check boxes 71 providing a user interface to select either of "turn on the just-link function" and "perform a data-writing at the velocity of XX" displayed as the selection information, a start button 72 to start the data-writing after the selection, and a cancel button 73 to cancel the settings in the screen.

As described above, according to the data-recording process performed in the information recording and reproducing system of the present embodiment, the system estimates, based on a test-writing and such conditions as a data capacity to be written to the optical disk, selection information enabling a data-writing without necessitating the just-link function (the function of resuming a recording with maintaining a data-continuity), and provides a user with the selection information indicating that the data-writing can be performed at a higher writing velocity without necessitating the just-link function when the data capacity is small, for example. Thereby, the user can arbitrarily select the just-link function being turned on/off or the data-recording being performed at a different writing velocity, immediately before starting the data-writing. Thus, the information recording and reproducing system is more convenient for a user because the system can easily perform a data-writing with priority being placed on a recording quality of data to be recorded on the optical disk, according to the user's preference.

Next, a description will be given of still another embodiment according to the present invention.

Figure 9:
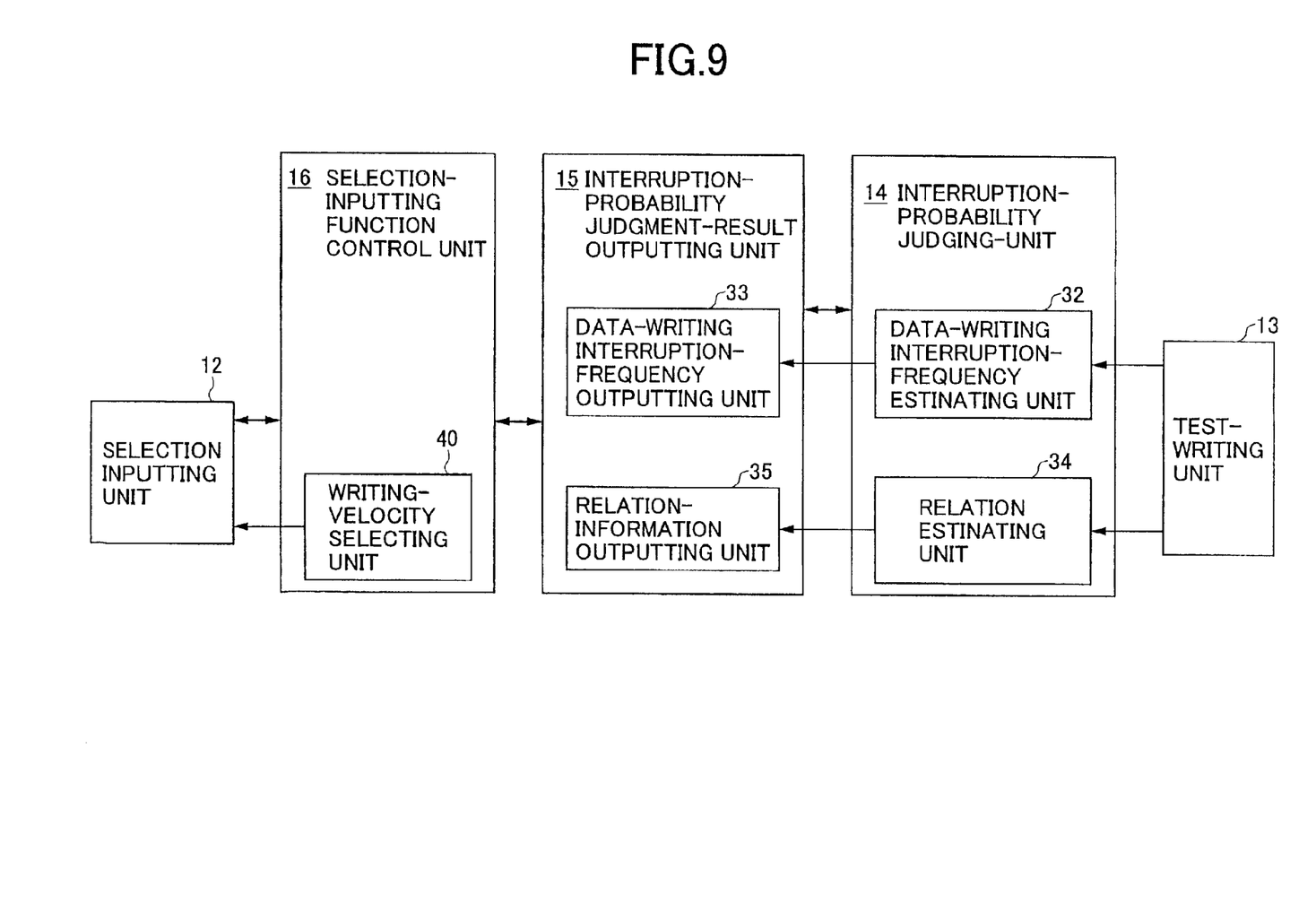
FIG. 9 is a functional block diagram showing inner functional structures of the interruption-probability judging unit, the interruption-probability judgment-result outputting unit, and a selection-inputting function control unit shown in FIG. 2, according to still another embodiment of the present invention.

As shown in FIG. 9, an information recording and reproducing system according to the present embodiment has the following structural features in comparison with the information recording and reproducing system shown in FIG. 2; the interruption-probability judging unit 14 of the personal computer 1 further comprises a data-writing interruption-frequency estimating unit 32 and a relation estimating unit 34; the interruption-probability judgment-result outputting unit 15 further comprises a data-writing interruption-frequency outputting unit 33 and a relation-information outputting unit 35; and the selection-inputting function control unit 16 further comprises a writing-velocity selecting unit 40.

When it is judged that there is a probability of an interruption during a data-writing, the data-writing interruption-frequency estimating unit 32 estimates a data-writing interruption frequency during a data-writing to the optical disk 4, based on conditions, such as a data capacity to be written to the optical disk 4, and a data transfer rate to the CD-R/RW drive 2.

The data-writing interruption-frequency outputting unit 33 displays the above-mentioned data-writing interruption frequency as well as the above-mentioned result of the judgment on the display, or prints out the data-writing interruption frequency and the result of the judgment by using a printer not shown in the figures.

The relation estimating unit 34 estimates relations between the above-mentioned data-writing interruption frequency and the above-mentioned data-writing velocity.

The relation-information outputting unit 35 displays relation information indicating the above-mentioned relations on the display, or prints out the relation information by using a printer not shown in the figures.

Based on the relation information output (displayed/printed) by the relation-information outputting unit 35, the writing-velocity selecting unit 40 performs a control of causing a user to perform a setting (selection) of a data-writing velocity as well as a selective input via the selection inputting unit 12.

Next, a description will be given of a data-recording process in this information recording and reproducing system.

Figure 10:
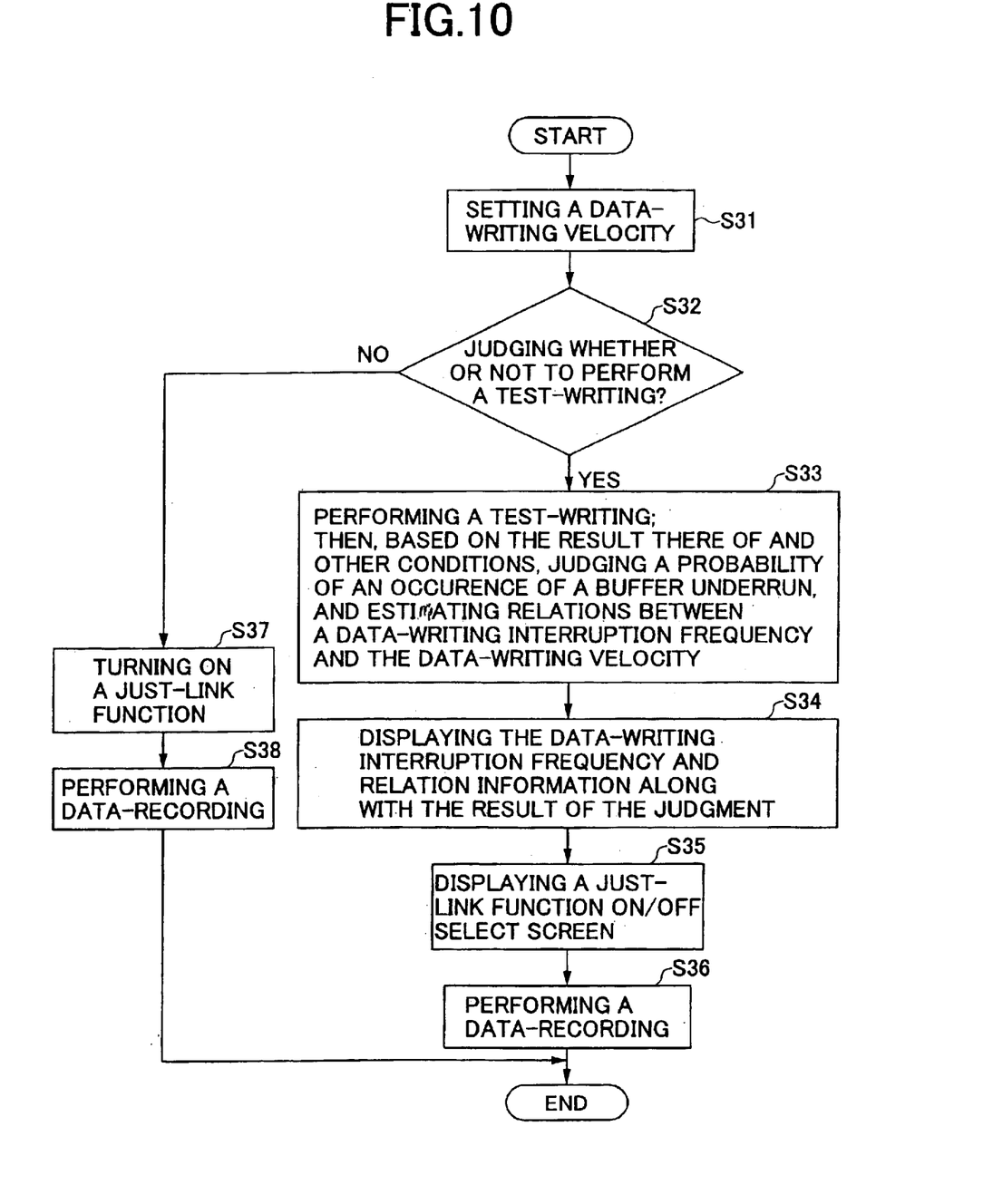
FIG. 10 is a flowchart showing a data-recording process in the information recording and reproducing system according to the present embodiment.

FIG. 10 is a flowchart showing the data-recording process in the information recording and reproducing system according to the present embodiment.

When a user operates the personal computer 1 so as to set a data-writing velocity as is the case for normal data-writing software, the control-command issuing unit 11 sets the data-writing velocity to the data-recording interruption-resumption control unit 21 of the CD-R/RW drive 2, in step 31. In step 32, it is judged whether or not to perform a test-writing. When it is judged, according to a selection input by the user via the selection inputting unit 12, that a test-writing is not to be performed (N in the step 32), step 37 is performed next, in which the control-command issuing unit 11 turns on (effective) the above-mentioned just-link function (the function of resuming a recording with maintaining a data-continuity) with respect to the data-recording interruption-resumption control unit 21. In step 38, the data-recording interruption-resumption control unit 21 of the CD-R/RW drive 2 controls the data-recording interrupting-resuming unit 22 to perform a data-recording at the above-mentioned data-writing velocity to the optical disk 4. Thereafter, this data-recording process is ended.

On the other hand, when it is judged, according to the selection input by the user via the selection inputting unit 12, that a test-writing is to be performed (Y in the step 32), step 33 is performed next, in which the test-writing unit 13 instructs the data-recording interruption-resumption control unit 21 of the CD-R/RW drive 2 to perform a test-writing. The data-recording interruption-resumption control unit 21 controls the data-recording interrupting-resuming unit 22 to perform the test-writing at the above-mentioned data-writing velocity to the optical disk 4, and sends the result of the test-writing back to the test-writing unit 13. The test-writing unit 13 sends the result of the test-writing to the interruption-probability judging unit 14. According to the result of the test-writing, the interruption-probability judging unit 14 judges a probability of an occurrence of a buffer underrun during a data-recording resulting from conditions, such as a data capacity to be written to the optical disk 4, the above-mentioned data-writing velocity, and a data transfer rate of the personal computer 1, and sends the result of the judgment to the interruption-probability judgment-result outputting unit 15. Additionally, the data-writing interruption-frequency estimating unit 32 of the interruption-probability judging unit 14 estimates a data-writing interruption frequency during a data-writing to the optical disk 4, based on conditions, such as a data capacity to be written to the optical disk 4, and a data transfer rate to the CD-R/RW drive 2. Further, the relation estimating unit 34 of the interruption-probability judging unit 14 estimates relations between the above-mentioned data-writing interruption frequency and the above-mentioned data-writing velocity.

In step 34, the relation-information outputting unit 35 creates relation information indicating a data-writing interruption frequency for each of several data-writing velocities, based on conditions, such as a data capacity to be written to the optical disk 4. The interruption-probability judgment-result outputting unit 15 synthesizes and displays the above-mentioned result of the judgment, the data-writing interruption frequency output by the data-writing interruption-frequency outputting unit 33, and the relation information created by the relation-information outputting unit 35. In step 35, a select screen including the result of the judgment and the relation information is displayed on the display for selectively inputting on/off (effective/ineffective) of the above-mentioned just-link function (the function of resuming a recording with maintaining a data-continuity). The selection-inputting function control unit 16 enables the inputting function of the selection inputting unit 12, and the writing-velocity selecting unit 40 enables a selective input of the data-writing velocity via the selection inputting unit 12.

In step 36, according to the selective input via the selection inputting unit 12, the control-command issuing unit 11 sends a control command turning on or off (effective or ineffective) the above-mentioned just-link function, or sends the selected data-writing velocity, to the data-recording interruption-resumption control unit 21. The data-recording interruption-resumption control unit 21 of the CD-R/RW drive 2 controls the data-recording interrupting-resuming unit 22 to turn on or off the above-mentioned just-link function and perform a data-recording at the selected data-writing velocity to the optical disk 4. Thereafter, this data-recording process is ended.

Figure 11:
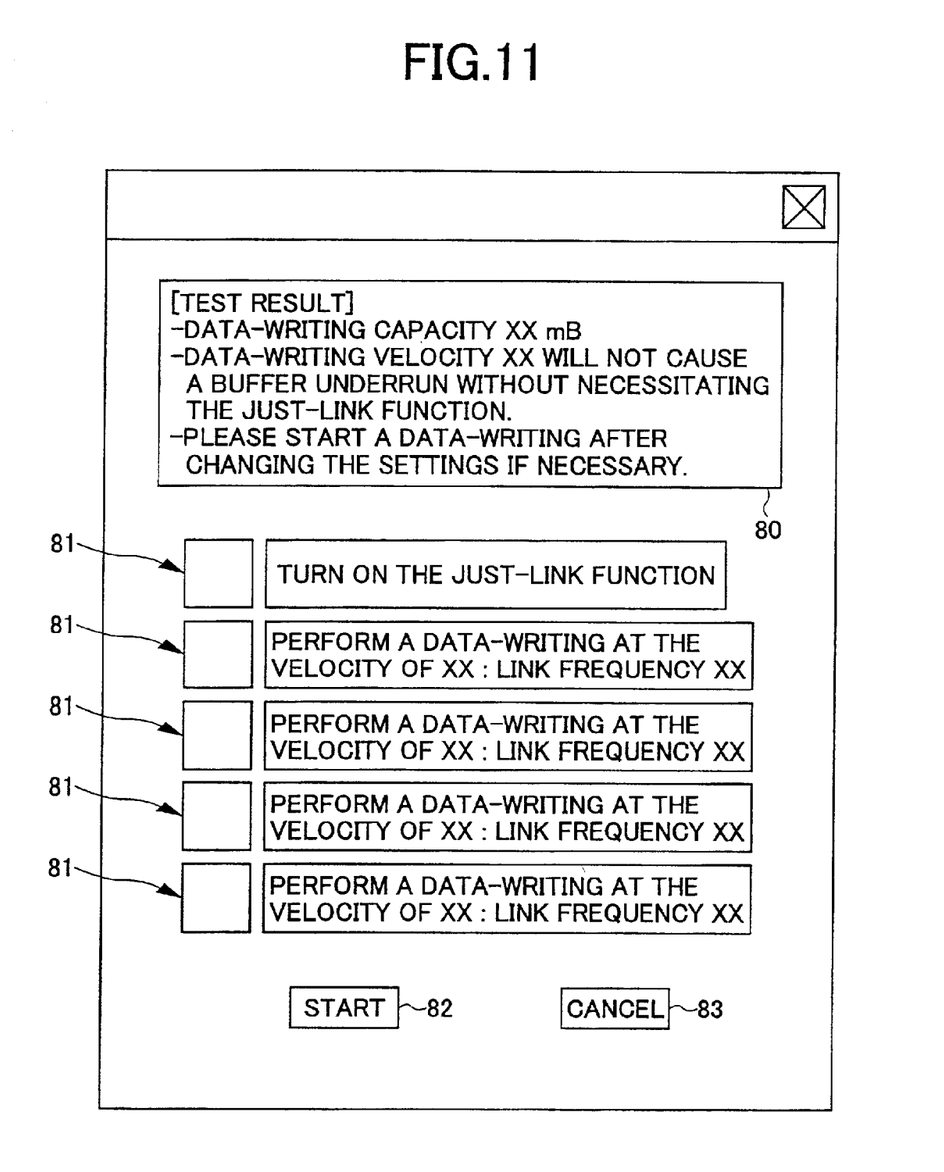
FIG. 11 is an illustration of an example of a just-link function on/off select screen displayed along with a judgment result and relation information in the data-recording process shown in FIG. 10.

FIG. 11 is an illustration of an example of a just-link function on/off select screen displayed along with the result of the judgment and the relation information in the above-described data-recording process.

This select screen is displayed according to the judgment of the data-writing software. In the screen are displayed a judgment result 80 containing messages, such as "data-writing capacity XX MB" and "Data-writing velocity XX will not cause a buffer underrun without necessitating the just-link function", as the result of the test-writing, and check boxes 81 to "turn on the just-link function" and to select from among a plurality of data-writing velocities upon performing a data-writing. A message displayed beside each of the check boxes 81 to select from among a plurality of the data-writing velocities includes a link frequency indicating a data-writing interruption frequency during a data-writing performed at each of the data-writing velocities. In the screen are also displayed a start button 82 to start the data-writing after checking either of the check boxes 81 to select from among a plurality of the data-writing velocities, and a cancel button 83 to cancel the settings in the screen.

As described above, according to the data-recording process performed in the information recording and reproducing system of the present embodiment, the system estimates relation information indicating a link frequency for each of data-writing velocities in a case not using the just-link function (the function of resuming a recording with maintaining a data-continuity), according to a test-writing and such conditions as a data capacity to be written to the optical disk and a data transfer rate, and provides a user with the relation information. Thereby, the user can arbitrarily select the just-link function being turned on/off or the data-recording being performed at a selected writing velocity, immediately before starting the data-writing. Thus, the information recording and reproducing system is more convenient for a user because the system can easily perform a data-writing with priority being placed on a recording quality of data to be recorded on the optical disk, according to the user's preference.

The present invention is not limited to the specifically disclosed embodiments, and variations and modifications may be made without departing from the scope of the present invention.

The present application is based on Japanese priority application No. 2000-350819 filed on Nov. 17, 2000, the entire contents of which are hereby incorporated by reference.

What is claimed is:

1. An information recording and reproducing system comprising:

a host device; and an information recording and reproducing device connected with said host device via a host interface, the information recording and reproducing device including a data-recording interrupting-resuming unit that performs a recording of data transferred from said host device via said host interface on a recording medium at a predetermined data-writing velocity, and, in a case of having interrupted said recording, resumes said recording by linking an end point of said data upon the interruption with a start point of said data upon the resumption so as to maintain a continuity of said data, wherein said host device includes a control-command issuing unit issuing a control command to said information recording and reproducing device, the control command causing said data-recording interrupting-resuming unit either to perform the interruption and resumption of the recording or not to perform the interruption and resumption of the recording, said host device further comprising a test-writing unit causing said information recording and reproducing device to perform a test-writing to said recording medium at a predetermined writing velocity;

an interruption-probability judging unit making a judgment on whether or not there is a probability of the interruption during a recording of data to said recording medium, according to a result of said test-writing; and said information recording and reproducing device includes a data-recording interruption-resumption control unit controlling said data-recording interrupting-resuming unit either to perform the interruption and resumption of the recording or not to perform the interruption and resumption of the recording, according to said control command received from said host device via said host interface.

2. The information recording and reproducing system as claimed in claim 1, further comprising a selection inputting unit supplying said control-command issuing unit with an arbitrary selection that causes said control-command issuing unit to issue either of a control command causing said data-recording interrupting-resuming unit to perform the interruption and resumption of the recording, and a control command causing said data-recording interrupting-resuming unit not to perform the interruption and resumption of the recording.

3. The information recording and reproducing system as claimed in claim 2, wherein said host device further includes:

an interruption-probability judgment-result outputting unit outputs a result of said judgment; and a selection-inputting function control unit enabling said selection via said selection inputting unit, after said interruption-probability judgment-result outputting unit outputs said result of said judgment.

4. The information recording and reproducing system as claimed in claim 3, wherein said interruption-probability judging unit further includes a selection-information creating unit creating appropriate selection information based on conditions including a data capacity to be written to said recording medium, when said interruption-probability judging unit judges that there is a probability of the interruption during a recording of data to said recording medium, the selection information being used to perform the recording without the interruptions, and said interruption-probability judgment-result outputting unit further includes a selection-information outputting unit outputting said selection information along with said result of said judgment.

5. The information recording and reproducing system as claimed in claim 3, wherein said interruption-probability judgment-result outputting unit further includes a data-writing interruption-frequency estimating unit estimating a data-writing interruption frequency during a recording of data to said recording medium, based on conditions including a data capacity to be written to said recording medium, and a data transfer rate to said information recording and reproducing device, when said interruption-probability judgment-result outputting unit judges that there is a probability of the interruption during the recording of the data to said recording medium, and said interruption-probability judgment-result outputting unit further includes a data-writing interruption-frequency outputting unit outputting said data-writing interruption frequency along with said result of said judgment.

6. The information recording and reproducing system as claimed in claim 5, wherein said interruption-probability judgment-result outputting unit further induces a relation estimating unit estimating a relation between said data-writing interruption frequency and said writing velocity, said interruption-probability judgment-result outputting unit further includes a relation-information outputting unit outputting relation information indicating said relation, and said selection-inputting function control unit further includes a writing-velocity selecting unit enabling a setting of said writing velocity and said selection via said selection inputting unit, according to said relation information output by said relation-information outputting unit.

* * * * *